United States Patent [19]

Meyer, Jr. et al.

[11] Patent Number: 4,468,490

[45] Date of Patent: Aug. 28, 1984

[54] ADHESIVE COMPOSITIONS

[75] Inventors: Max F. Meyer, Jr.; Richard L. McConnell, both of Kingsport, Tenn.

[73] Assignee: Eastman Kodak Company, Rochester, N.Y.

[21] Appl. No.: 591,707

[22] Filed: Mar. 21, 1984

[51] Int. Cl.³ .......................... C08K 5/10; C08L 67/06
[52] U.S. Cl. ..................................... 524/311; 156/332; 524/306; 524/312; 524/315; 524/318; 524/605
[58] Field of Search ................ 156/332; 524/311, 306, 524/312, 315, 318, 605

[56] References Cited

U.S. PATENT DOCUMENTS

| 3,578,621 | 5/1971 | Stapfer | 524/306 |
| 3,691,219 | 9/1972 | Boussely | 524/312 |
| 4,012,357 | 3/1977 | Foulks et al. | 524/312 |
| 4,363,891 | 12/1982 | Rosen et al. | 524/318 |

OTHER PUBLICATIONS

Research Disclosure, Dec. 1978, p. 6, Disclosure 17610.

*Primary Examiner*—Ronald W. Griffin
*Attorney, Agent, or Firm*—John F. Stevens; William P. Heath, Jr.

[57] ABSTRACT

Disclosed are blends of polyesters and esters of glycerin or propylene glycol which are useful as hot-melt adhesives for fabrics.

8 Claims, No Drawings

ADHESIVE COMPOSITIONS

DESCRIPTION

1. Technical Field

This invention relates to blends of polyesters and esters of glycerin or propylene glycol which are useful as hot-melt adhesives for fabrics.

2. Background of the Invention

Certain low-melting polyesters in powder form are useful as fabric adhesives. One method of using the powder involves the making of fusible interlinings which are subsequently bonded to a face fabric. For example, fusible interlinings are used in the manufacture of suits, in shirt collars and cuffs, and in the waistband of trousers. Powders are also useful as binders in nonwoven fabrics. Powders used in these applications are generally coarse (40–70 mesh or 0.42–0.21 mm), medium (70–200 mesh or 0.21–0.07 mm), or fine powders (<200 mesh or <0.07 mm).

In commercial bonding applications such as the bonding of a fusible interlining to a face fabric, the faster the powder melts and flows out to make a bond the more economical the process becomes. Increasing the melting rate of the powder increases line speed and production rate and reduces the exposure time of the fabric to intense heat.

Various polymeric powders are used in these processes including polyesters, polyethylenes, polyamides, poly(vinyl chloride), and the like. Polyesters are a major type of adhesive used in these applications.

A need has existed for an additive that could substantially increase the melt down rate of polyester powders without adversely affecting bond strength. Such an adhesive would provide an economic advantage in faster line speed and increased production rates with the same equipment.

It has now been found that low melting compounds such as acyl esters of propylene glycol and glycerin having melting points of about 35° to about 75° C. significantly increase the melt down rate of the polyester powders compared to the melting rate of the unmodified powders.

DISCLOSURE OF THE INVENTION

According to the present invention, adhesive compositions are provided which are described as polyester hot-melt adhesives containing about 0.2 wt. % to about 25 wt. % of low-melting esters of propylene glycol or glycerin which have melting points of about 35° to about 75° C. These compositions, which show increased melting rates over the unmodified polyester and allow the use of lower bonding temperatures, are useful as fabric adhesives.

The adhesive compositions comprise
(a) a polyester derived from 100 mole % of an acid component comprising terephthalic acid, isophthalic acid, a mixture of terephthalic and isophthalic acid or hexahydroterephthalic acid and a glycol component comprising at least one glycol having from 2 to 12 carbon atoms, the polyester having a melting point of about 80°–180° C. and a heat of fusion of less than 10 calories per gram, and
(b) from about 0.2% to about 25% based on the weight of the polyester of a compound selected from

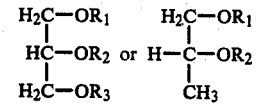

wherein $R_1$ is

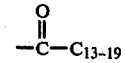

or H and $R_2$ and $R_3$ are each

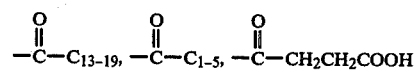

or H, and at least one of $R_1$, $R_2$ and $R_3$ is

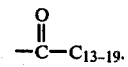

It should be understood that the rest of the valences in the above acyl groups are satisfied with hydrogen.

The acid component of the polyester comprises at least 50 mole % of at least one of the following acids: terephthalic acid, isophthalic acid, a mixture of terephthalic and isophthalic, and hexahydroterephthalic acid (sometimes called 1,4-cyclohexanedicarboxylic acid). Up to 50 mole % of the acid component may be an aliphatic or cycloaliphatic dibasic acid containing 4 to 12 carbon atoms other than hexahydroterephthalic acid. Preferred acid components comprise at least 60 mole % terephthalic acid. Other preferred acid components comprise at least 60 mole % terephthalic acid with up to 40 mole % being isophthalic or glutaric acid.

The glycol component of the polyester comprises at least one glycol having from 2 to 12 carbon atoms. Preferred glycol components comprise at least one of the following glycols: ethylene glycol, diethylene glycol, 1,4-butanediol and 1,6-hexanediol. Other preferred glycol components contain at least 80 mole % of a mixture of 1,4-butanediol and 1,6-hexanediol, and at least 80 mole % of a mixture of diethylene glycol and 1,4-butanediol.

The polyesters useful in the practice of this invention are those crystalline or semi-crystalline polyesters having melting points of about 80° to about 180° C. with heats of fusion of less than 10 calories per gram. Preferred polyesters have melting points of about 100° C. to about 150° C. The inherent viscosity of these polyesters may range from about 0.4 to about 1.2 but the preferred range is about 0.5 to about 1.0. Many such polyesters are commercially available, and they may be produced by conventional methods well known in the art.

An additive that substantially increases the melt down rate of polyester powders without adversely affecting bond strength obviously provides an economic advantage in faster line speeds and increased production rates with the same equipment. It is important that the additive not deleteriously affect the good free flowing characteristics of the polyester powders.

It has now been found that low melting compounds such as saturated acyl esters of propylene glycol and glycerin having melting points of about 35° to about 75°

C. significantly increase the melt down rate of the polyester powders compared to the melting rate of the unmodified powders.

These additives may be added to the polyesters by melt blending after which the polymer blend is ground to the desired particle size, by cogrinding the polyester with the additive, or by making blends of coarse, medium, or fine powders of each component.

The low melting additives useful in the practice of this invention are acyl esters of propylene glycol and glycerin with at least one acyl group containing 14 to 20 carbon atoms. These esters may also contain one or more acyl groups containing 2 to 6 carbon atoms

(succinic acid radical). The concentration of low melting additive may range from about 0.2 wt. % to about 25 wt. % but the preferred concentration range is about 1 to about 20%.

Some suitable additives which are available commercially are the Myvaplex® glyceryl monostearate, Myverol® distilled monoglycerides, Myverol distilled propylene glycol monoesters, and Myvacet® distilled acetylated monoglycerides supplied by Eastman Chemical Products, Incorporated.

These mono-, di- or tri-esters of glycerin and propylene glycol may be produced by conventional methods well known in the art.

Polyester powder blends containing the low melting additives are free-flowing powders which may be readily applied to fabrics by conventional random sprinkling, powder point, or paste application methods. These powder blends may also be applied from electrostatic spray guns. It was also found that the presence of the additive substantially decreases the bonding temperature of the polyester adhesive. This fact is especially important when temperature sensitive fabrics are used, when faster fabric assembly rates are desired or when old presses with limited temperature capabilities are used.

The following examples are submitted for a better understanding of the invention.

EXAMPLE 1

One hundred grams of a polyester consisting of 80 mole % terephthalic acid, 20 mole % isophthalic acid, 80 mole % 1,6-hexanediol, and 20 mole % 1,4-butanediol and having an inherent viscosity of 0.72 (in 60/40 phenol/tetrachloroethane solution at 23° C.), a melting point of 104° C., and a glass transition temperature of 12° C. is cryogenically ground in liquid nitrogen in a Mikro Pulverizer using a 2 mm screen. The powder is dried at 60° C. under vacuum overnight and screened with agitation for 15 minutes to provide coarse powder, medium powder, and fine powder.

Approximately 0.01 g of the medium powder is placed in a symmetrical pile on a glass slide. The slide containing the powder is placed on a hot plate surface maintained at 155° C. The polyester powder has a melt down time (time for the powder to completely melt) of 16.6 seconds.

EXAMPLE 2

The polyester described in Example 1 (55.25 g) and 9.75 g of a distilled monoglyceride derived essentially from glycerin and stearic acid and having a melting point of 69° C. and designated commercially as Myverol 18-06 (Eastman Chemical Products, Inc.) are blended in a Brabender Plastograph mixer at 135° C. for five minutes in the melt phase under nitrogen. The polyester/monoglyceride blend is cryogenically ground in liquid nitrogen in a Mikro Pulverizer using a 2 mm screen. The powder is dried overnight at 60° C. under vacuum and screened with agitation for 15 minutes to provide coarse powder, medium powder, and fine powder.

Approximately 0.01 g of the medium powder is placed in a symmetrical pile on a glass slide. The slide containing the powder is placed on a hot plate surface maintained at 155° C. The polyester powder has a melt down time of eight seconds.

EXAMPLE 3

The procedure of Example 1 is followed except that the polyester consists of 70 mole % terephthalic acid, 30 mole % glutaric acid, 45 mole % diethylene glycol, and 55 mole % 1,4-butanediol. The polymer has an inherent viscosity of 0.83 (in 60/40 phenol/tetrachloroethane), melting point of 109° C., and a glass transition temperature of 6° C. The melt down time of this polyester is 14.6 seconds.

EXAMPLE 4

The procedure of Example 2 is followed using the polyester described in Example 3 with the following concentrations of Myverol 18-06 monoglyceride. The melt down times of medium powder of these compositions are given below with the compositions.

| Polyester g | Myverol 18-06 Monoglyceride g | Melt Down Time sec |
| --- | --- | --- |
| 63.7 | 1.3 (2%) | 12.6 |
| 61.75 | 3.25 (5%) | 8.0 |
| 58.50 | 6.5 (10%) | 8.1 |
| 55.25 | 9.75 (15%) | 7.9 |

Similarly good results are obtained with powder blends.

The medium powder containing 5 wt. % Myverol 18-06 is coated on cotton interlining fabric using a wheel applicator (coating conditions were: heated roll 180° C.; chill roll 13° C.; line speed 3–3.7 meters/minute, fusion temperature variac setting 60–75%) to provide fusible interlining having a coating weight of 22.9 g/m$^2$ (19 g/yard$^2$). The coated interlining is bonded to 65:35 polyester:cotton fabric using an electrically heated press. The unmodified medium powder is applied in a like manner for a control.

The unmodified powder requires a minimum bonding temperature of 120° C. and a 15 second dwell time to give a T-peel bond strength of 0.215 kg/cm (1.2 pli), compared to a minimum bonding temperature of 100° C. and 15 seconds dwell time for the composition containing 5% Myverol 18-06 to give a bond strength of 0.1786 kg/cm (1.0 pli).

EXAMPLE 5

The procedure of Example 1 is followed except that the polyester consists of 100 mole % terephthalic acid, 80 mole % 1,6-hexanediol, and 20 mole % 1,4-butanediol. The polymer has an inherent viscosity (determined in 60/40 phenol/tetrachloroethane solution)

of 0.72, melting point of 125° C. and a glass transition temperature of 12° C. The melt down time of this polyester is 24.9 seconds.

EXAMPLE 6

The procedure of Example 2 is followed to blend the polyester described in Example 5 with 10 wt. % of a propylene glycol monoester commercially available as Myverol P-06. The melt down time of medium powder of this blend is 12.1 seconds.

Similarly good results are obtained using Myvaplex 600 glyceryl monostearate; Myvacet 7-07; or Myvacet 5-07) acetylated monoglycerides or Myverol 18-06 monoglyceride.

In all the above examples according to this invention, the $\Delta H_f$ of the polyester is less than 10 cal/gm.

Whenever the term "inherent viscosity" (I.V.) is used in this application, it will be understood to refer to viscosity determinations made at 25° C. using 0.50 gram of polymer per 100 ml. of a solvent composed of 60 wt. % phenol and 40 wt. % tetrachloroethane.

The "melting point" ($T_m$) of the polymers described in this application are readily obtained with a Differential Scanning Calorimeter.

The "heat of fusion" $\Delta H_f$ of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in Journal of Applied Polymer Science 20, 1209 (1976). Measurement of $\Delta H_f$ is also described in duPont Thermal analysis Bulletin No. 900-8 (1965). Qualitatively it is possible to compare the degree of crystallinity of polymers by comparing their $\Delta H_f$ values.

The strength of the bonds is determined by the so-called "Peel Test" based on a modification (i.e., three test specimens) of the ASTM "T-Peel Test" set forth on pages 63 and 64 of the 1964 edition of the BOOK OF ASTM STANDARDS, published by the American Society for Testing Materials, and more specifically identified as Test Number D-1876-61-T.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. Adhesive composition comprising
   (a) a polyester derived from 50 to 100 mole % of an acid component comprising terephthalic acid, isophthalic acid, or a mixture of terephthalic and isophthalic acid, and a glycol component comprising at least one glycol having from 2 to 12 carbon atoms, said polyester having a melting point of about 80°–180° C. and a heat of fusion of less than 10 calories per gram, and
   (b) from about 0.2% to about 25% based on the weight of said polyester of an ester selected from

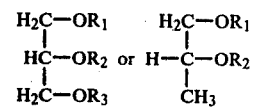

wherein $R_1$ is

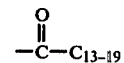

or H and $R_2$ and $R_3$ are each

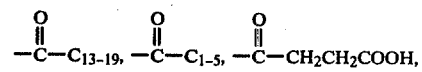

or H, and at least one of $R_1$, $R_2$ and $R_3$ is

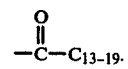

2. Adhesive composition according to claim 1 wherein said polyester comprises at least 60 mole % terephthalic acid.

3. Adhesive composition according to claim 2 wherein said polyester comprises up to 40 mole % isophthalic or glutaric acid.

4. Adhesive composition according to claim 1 wherein said glycol component comprises at least one glycol selected from ethylene glycol, diethylene glycol, 1,4-butanediol and 1,6-hexanediol.

5. Adhesive composition according to claim 1 wherein said ester is at least 60% by weight of a monoester of glycerin.

6. Adhesive composition according to claim 1 wherein said ester comprises an ester of propylene glycol.

7. Adhesive composition according to claim 1 wherein said ester comprises an acetylated monoglyceride.

8. Adhesive composition according to claim 1 wherein said ester comprises a succinylated monoglyceride.

* * * * *